(12) United States Patent
Papasakellariou

(10) Patent No.: US 12,476,745 B2
(45) Date of Patent: Nov. 18, 2025

(54) PUCCH TRANSMISSIONS WITH MULTICAST HARQ-ACK INFORMATION

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 390 days.

(21) Appl. No.: 18/296,887

(22) Filed: Apr. 6, 2023

(65) Prior Publication Data

US 2023/0336285 A1 Oct. 19, 2023

Related U.S. Application Data

(60) Provisional application No. 63/332,141, filed on Apr. 18, 2022, provisional application No. 63/332,962, (Continued)

(51) Int. Cl.
*H04L 1/1829* (2023.01)
*H04L 1/1607* (2023.01)
(Continued)

(52) U.S. Cl.
CPC .......... *H04L 1/1864* (2013.01); *H04L 1/1664* (2013.01); *H04L 1/1671* (2013.01);
(Continued)

(58) Field of Classification Search
CPC ... H04L 1/1864; H04L 1/1854; H04L 1/1896; H04L 1/1671; H04L 1/1861;
(Continued)

(56) References Cited

U.S. PATENT DOCUMENTS

2021/0212039 A1 7/2021 Takeda et al.
2021/0368528 A1* 11/2021 Yoshimura ........ H04W 72/1268
(Continued)

FOREIGN PATENT DOCUMENTS

WO 2021155827 A1 8/2021

OTHER PUBLICATIONS

"3rd Generation Partnership Project; Technical Specification Group Radio Access Network; NR; Physical channels and modulation (Release 17)", 3GPP TS 38.211 V17.1.0, Mar. 2022, 135 pages.
(Continued)

*Primary Examiner* — Tonia L Dollinger

(57) ABSTRACT

Apparatuses and methods for transmitting a physical uplink control channel (PUCCH) with multicast hybrid automatic repeat request acknowledgement (HARQ-ACK) information. A method includes receiving information for a set of PUCCH resources and first physical downlink shared channels (PDSCHs) that provide first transport blocks (TBs). The method further includes determining first hybrid automatic repeat request acknowledgement (HARQ-ACK) information bits associated with the first TBs and to provide the first HARQ-ACK information bits only when at least one PUCCH resource from the set of PUCCH resources overlaps in time with a transmission of a first physical uplink shared channel (PUSCH). A value for each of the first HARQ-ACK information bits corresponds to positive acknowledgement (ACK). The method further includes transmitting the first PUSCH. The first PUSCH includes the first HARQ-ACK information bits when the at least one PUCCH resource overlaps in time with the first PUSCH.

18 Claims, 10 Drawing Sheets

Related U.S. Application Data filed on Apr. 20, 2022, provisional application No. 63/390,876, filed on Jul. 20, 2022.

(51) Int. Cl.
| | |
|---|---|
| *H04L 1/1867* | (2023.01) |
| *H04W 72/11* | (2023.01) |
| *H04W 72/1268* | (2023.01) |
| *H04W 72/21* | (2023.01) |
| *H04W 72/566* | (2023.01) |

(52) U.S. Cl.
CPC .......... *H04L 1/1854* (2013.01); *H04L 1/1861* (2013.01); *H04L 1/1896* (2013.01); *H04W 72/11* (2023.01); *H04W 72/1268* (2013.01); *H04W 72/21* (2023.01); *H04W 72/569* (2023.01)

(58) Field of Classification Search
CPC .................. H04L 1/1664; H04W 72/1268; H04W 72/21; H04W 72/11; H04W 72/569
See application file for complete search history.

(56) References Cited

U.S. PATENT DOCUMENTS

| | | | |
|---|---|---|---|
| 2021/0410155 A1 | 12/2021 | Khoshnevisan et al. | |
| 2022/0369350 A1* | 11/2022 | Yoshimura | ............ H04L 1/1614 |
| 2024/0032044 A1* | 1/2024 | Su | ......................... H04W 72/04 |
| 2024/0163027 A1* | 5/2024 | Lei | ....................... H04L 1/1861 |

OTHER PUBLICATIONS

"3rd Generation Partnership Project; Technical Specification Group Radio Access Network; NR; Multiplexing and channel coding (Release 17)", 3GPP TS 38.212 V17.1.0, Mar. 2022, 197 pages.
"3rd Generation Partnership Project; Technical Specification Group Radio Access Network; NR; Physical layer procedures for control (Release 17)", 3GPP TS 38.213 V17.1.0, Mar. 2022, 245 pages.
"3rd Generation Partnership Project; Technical Specification Group Radio Access Network; NR; Physical layer procedures for data (Release 17)", 3GPP TS 38.214 V17.1.0, Mar. 2022, 225 pages.
"3rd Generation Partnership Project; Technical Specification Group Radio Access Network; NR; Medium Access Control (MAC) protocol specification (Release 17)", 3GPP TS 38.321 V17.0.0, Mar. 2022, 221 pages.
"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.
International Search Report and Written Opinion issued Aug. 11, 2023 regarding International Application No. PCT/KR2023/005240, 7 pages.
Catt et al., "Discussion on reliability improvement mechanism for RRC_CONNECTED UEs in Mbs", 3GPP TSG RAN WG1 #105-e, R1-2104492, May 2021, 10 pages.
Moderator (LG Electronics), "Summary #2 of PDSCH/PUSCH enhancements (Scheduling/HARQ)", 3GPP TSG RAN WG1 #108-e, R1-2202679, Mar. 2022, 82 pages.
Lenovo et al., "On group scheduling mechanism for RRC_CONNECTED UEs", 3GPP TSG RAN WG1 #107bis-e, R1-2200471, Jan. 2022, 10 pages.
Extended European Search Report issued Mar. 24, 2025 regarding Application No. 23792153.1, 12 pages.
CMCC, "Agreements for NR MBS up to RAN1#107bis", 3GPP TSG RAN WGl #107bis-e, R1-2200810, Nov. 2022, 47 pages.
Moderator (Huawei), "FL summary#3 on improving reliability for MBS for RRC_CONNECTED UEs", 3GPP TSG RAN WG1 #107bis-e, R1-2200719, Jan. 2022, 84 pages.
European Patent Office, Communication pursuant to Article 94(3) EPC issued Oct. 13, 2025 regarding Application No. 23792153.1, 8 pages.

* cited by examiner

PUCCH TRANSMISSIONS WITH MULTICAST HARQ-ACK INFORMATION

CROSS-REFERENCE TO RELATED APPLICATION AND CLAIM OF PRIORITY

This application claims priority under 35 U.S.C. § 119(e) to U.S. Provisional Patent Application No. 63/332,141 filed on Apr. 18, 2022, U.S. Provisional Patent Application No. 63/332,962 filed on Apr. 20, 2022, and U.S. Provisional Patent Application No. 63/390,876 filed on Jul. 20, 2022. The above-identified provisional patent applications are hereby incorporated by reference in their entirety.

TECHNICAL FIELD

The present disclosure relates generally to wireless communication systems and, more specifically, to transmitting a physical uplink control channel (PUCCH) with multicast hybrid automatic repeat request acknowledgement (HARQ-ACK) information.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for transmitting a PUCCH with multicast HARQ-ACK information.

In one embodiment, a method for providing hybrid automatic repeat request acknowledgement (HARQ-ACK) information is provided. The method includes receiving information for a set of physical uplink control channel (PUCCH) resources and first physical downlink shared channels (PDSCHs) that provide first transport blocks (TBs). The method further includes determining first hybrid automatic repeat request acknowledgement (HARQ-ACK) information bits associated with the first TBs and to provide the first HARQ-ACK information bits only when at least one PUCCH resource from the set of PUCCH resources overlaps in time with a transmission of a first physical uplink shared channel (PUSCH). A value for each of the first HARQ-ACK information bits corresponds to positive acknowledgement (ACK). The method further includes transmitting the first PUSCH. The first PUSCH includes the first HARQ-ACK information bits when the at least one PUCCH resource overlaps in time with the first PUSCH.

In another embodiment, a user equipment (UE) is provided. The UE includes a transceiver configured to receive information for a set of PUCCH resources and first PDSCHs that provide first TBs. The UE further includes a processor operably coupled to the transceiver. The processor is configured to determine first HARQ-ACK information bits associated with the first TBs and to provide the first HARQ-ACK information bits only when at least one PUCCH resource from the set of PUCCH resources overlaps in time with a transmission of a first PUSCH. A value for each of the first HARQ-ACK information bits corresponds to positive ACK. The transceiver is further configured to transmit the first PUSCH. The first PUSCH includes the first HARQ-ACK information bits when the at least one PUCCH resource overlaps in time with the first PUSCH.

In yet another embodiment, a base station is provided. The base station includes a transceiver configured to transmit information for a set of PUCCH resources and first PDSCHs that provide first TBs. The set of PUCCH resources includes a PUCCH resource for each combination of values for a number of HARQ-ACK information bits. At least one value from the values corresponds to negative acknowledgement (NACK). The base station further includes a processor operably coupled to the transceiver. The processor is configured to determine whether a condition is valid. The condition is that a reception of a first PUCCH would overlap in time with a reception of a PUSCH or with a reception of a second PUCCH. The first PUCCH includes first HARQ-ACK information bits associated with the first TBs and uses at least one PUCCH resource from the set of PUCCH resources. The transceiver configured to receive one of the first PUCCH when the condition is not valid, wherein at least one of the first HARQ-ACK information bits has a value that corresponds to NACK, or the PUSCH or the second PUCCH when the condition is valid, wherein the PUSCH or the second PUCCH includes the first HARQ-ACK information bits. A number of the first HARQ-ACK information bits is smaller than or equal to the number of HARQ-ACK information bits.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
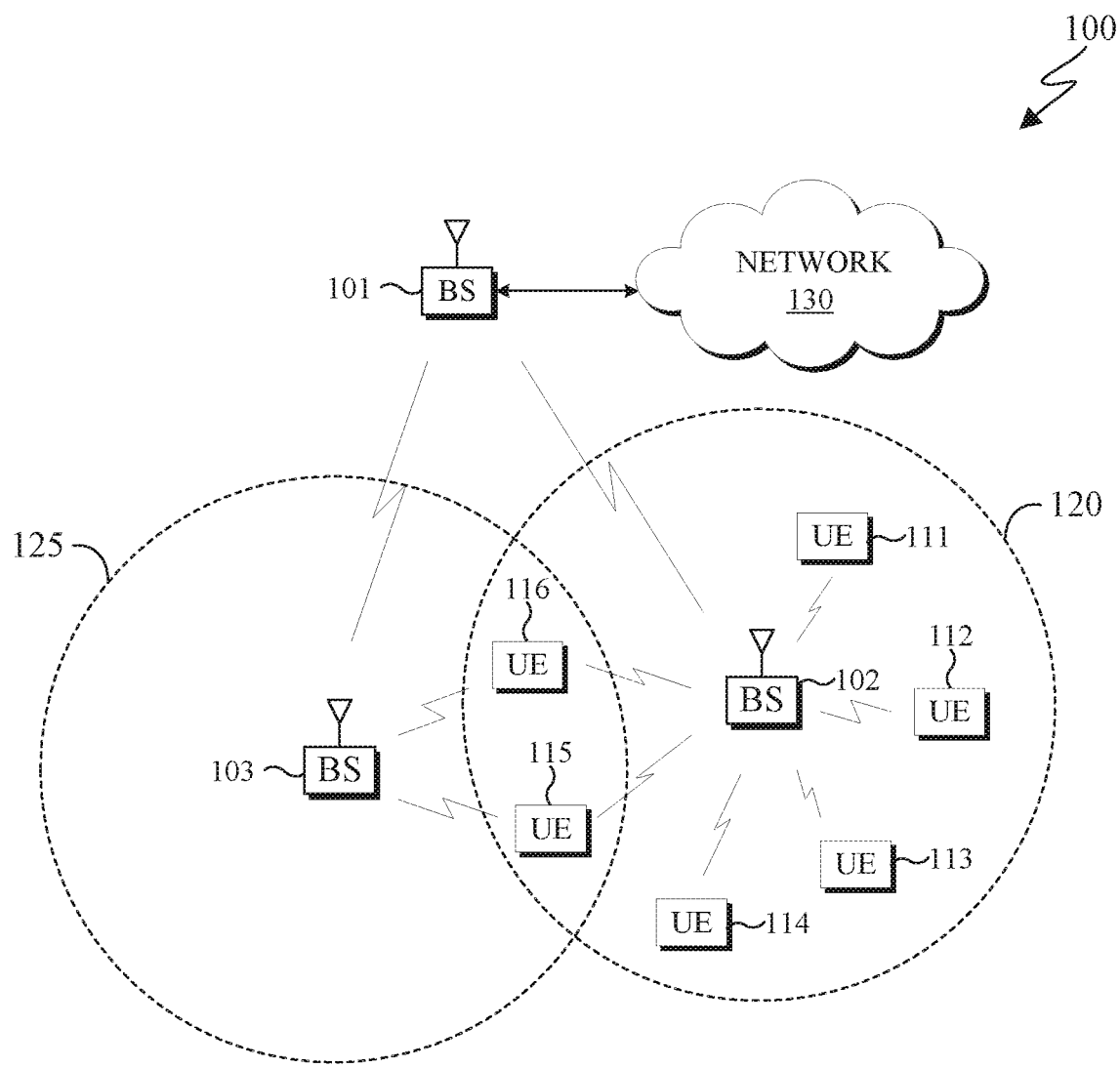
FIG. 1 illustrates an example wireless network according to embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 38.211 v17.1.0, "NR; Physical channels and modulation;" 3GPP TS 38.212 v17.1.0, "E-UTRA, NR, Multiplexing and Channel coding"; 3GPP TS 38.213 v17.1.0; "NR, Physical Layer Procedures for Control"; 3GPP TS 38.214 v17.1.0; "NR, Physical Layer Procedures for Data"; 3GPP TS 38.321 v17.0.0, "NR; Medium Access Control (MAC) protocol specification"; 3GPP TS 38.331 v17.0.0, "NR; Radio Resource Control (RRC) Protocol Specification."

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
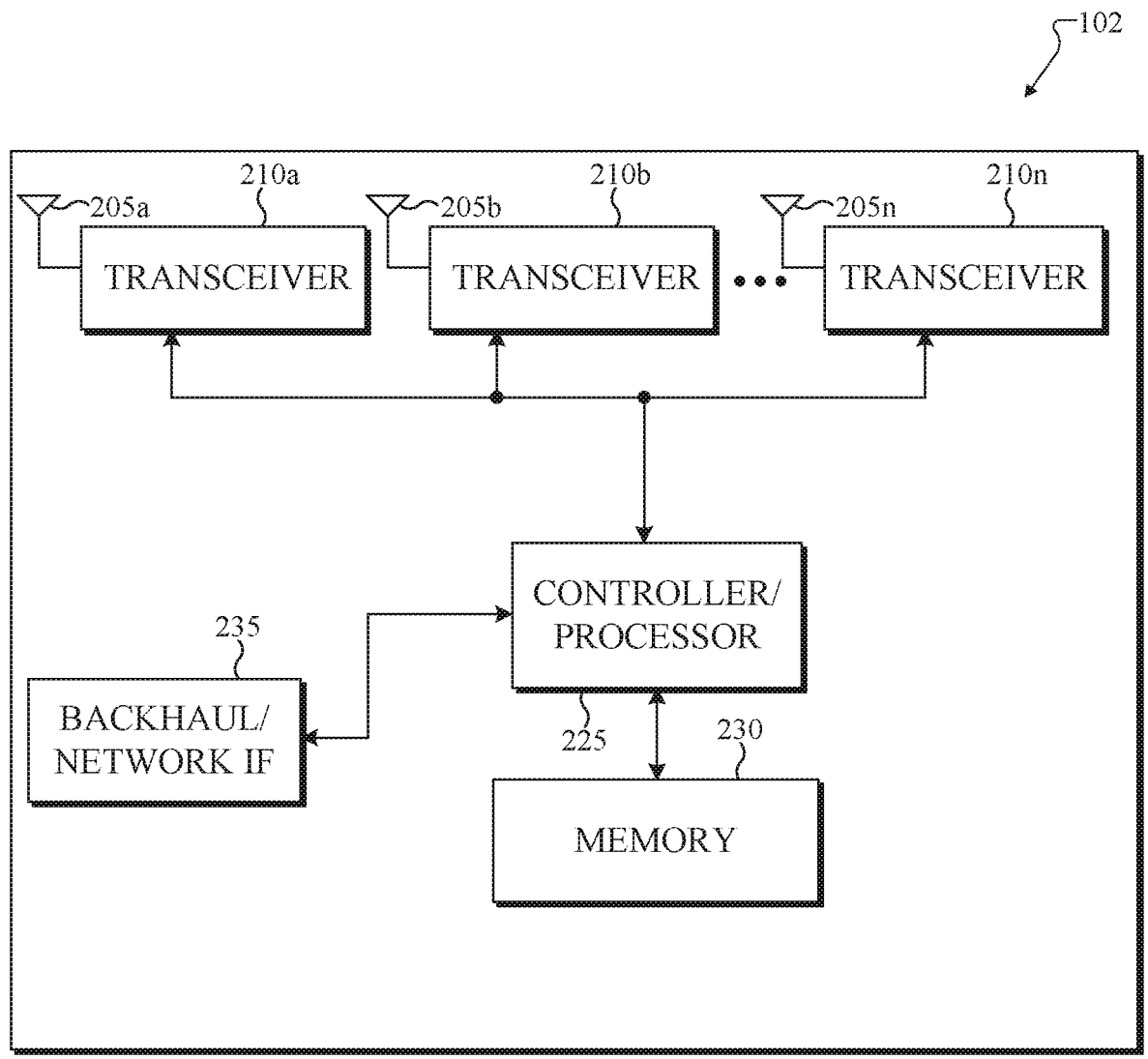
FIG. 2 illustrates an example gNodeB (gNB) according to embodiments of the present disclosure.
Figure 3:
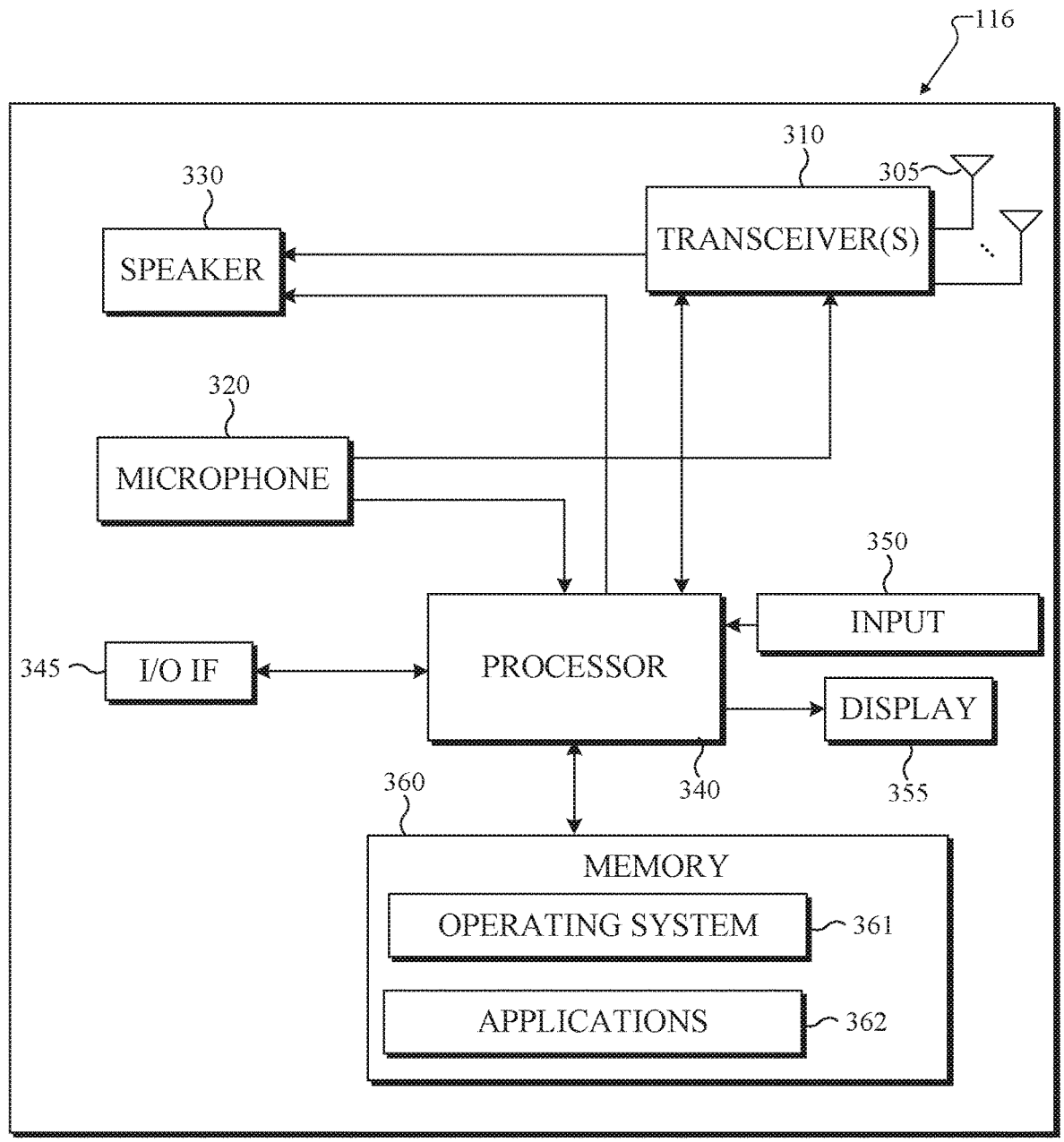
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network 100 according to this disclosure. The embodiment of the wireless network 100 shown in FIG. 1 is for illustration only. Other embodiments of the wireless network 100 can be used without departing from the scope of this disclosure.

The wireless network 100 includes a gNodeB (gNB) 101, a gNB 102, and a gNB 103. The gNB 101 communicates with the gNB 102 and the gNB 103. The gNB 101 also communicates with at least one Internet Protocol (IP) network 130, such as the Internet, a proprietary IP network, or other data network.

Depending on the network type, other well-known terms may be used instead of "gNodeB" or "gNB," such as "base station" or "access point." For the sake of convenience, the terms "gNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115, the UE 116, UE 117 and UE 118. In some embodiments, one or more of the gNBs 101-103 may communicate with each other and with the UEs 111-118 using 5G, long-term evolution (LTE), LTE-A, WiMAX, or other advanced wireless communication techniques. In some embodiments, multiple UEs, e.g., UE 117, UE 118 and UE 119 may communicate directly with each other through device-2-device communication. In some embodiments, a UE, e.g., UE 119, is outside the coverage area of the network, but can communicate with other UEs inside the coverage area of the network, e.g., UE 118, or outside the coverage area of the network.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network 100, various changes may be made to FIG. 1. For example, the wireless network 100 can include any number of gNBs and any number of UEs in any suitable arrangement. Also, the gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as external telephone networks or other types of data networks.

As described in more detail below, one or more of the UEs 111-116 include circuitry, programing, or a combination thereof for supporting transmitting a PUCCH with multicast HARQ-ACK information. In certain embodiments, one or more of the gNBs 101-103 include circuitry, programing, or a combination thereof for supporting reception of a PUCCH with multicast HARQ-ACK information.

FIG. 2 illustrates an example gNB 102 according to this disclosure. The embodiment of the gNB 102 shown in FIG. 2 is for illustration only, and other gNBs of FIG. 1 can have the same or similar configuration. However, gNBs come in a wide variety of configurations, and FIG. 2 does not limit the scope of this disclosure to any particular implementation of an gNB. It is noted that gNB 101 and gNB 103 can include the same or similar structure as gNB 102.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for supporting reception of a PUCCH with multicast HARQ-ACK information. Any of a wide variety of other functions could be supported in the gNB 102 by the controller/processor 225.

The controller/processor 225 is also capable of executing programs and other processes resident in the memory 230, such as an processes for receiving a PUCCH with multicast HARQ-ACK information. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for supporting transmission of a PUCCH with multicast HARQ-ACK information. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
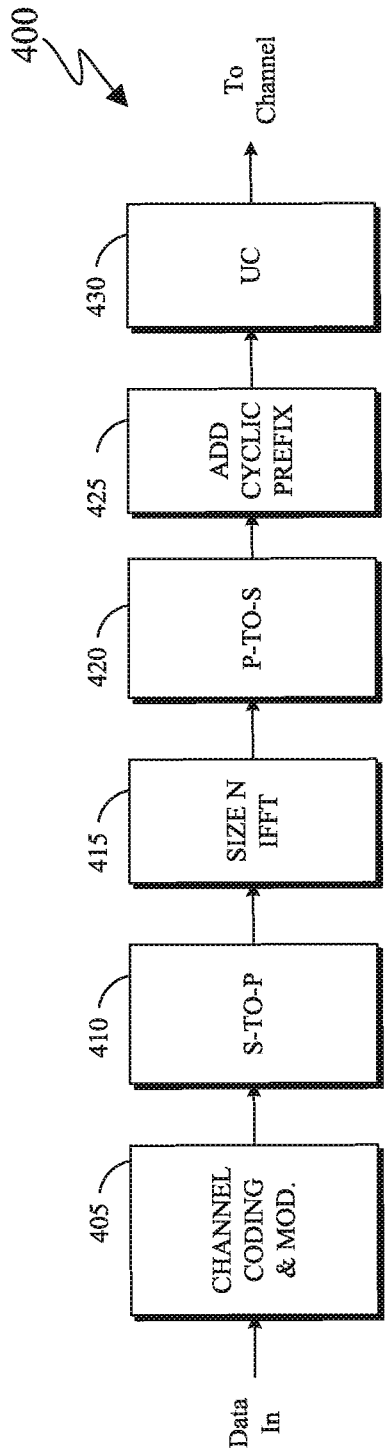
FIGS. 4 and 5 illustrate example wireless transmit and receive paths according to embodiments of the present disclosure.
Figure 5:
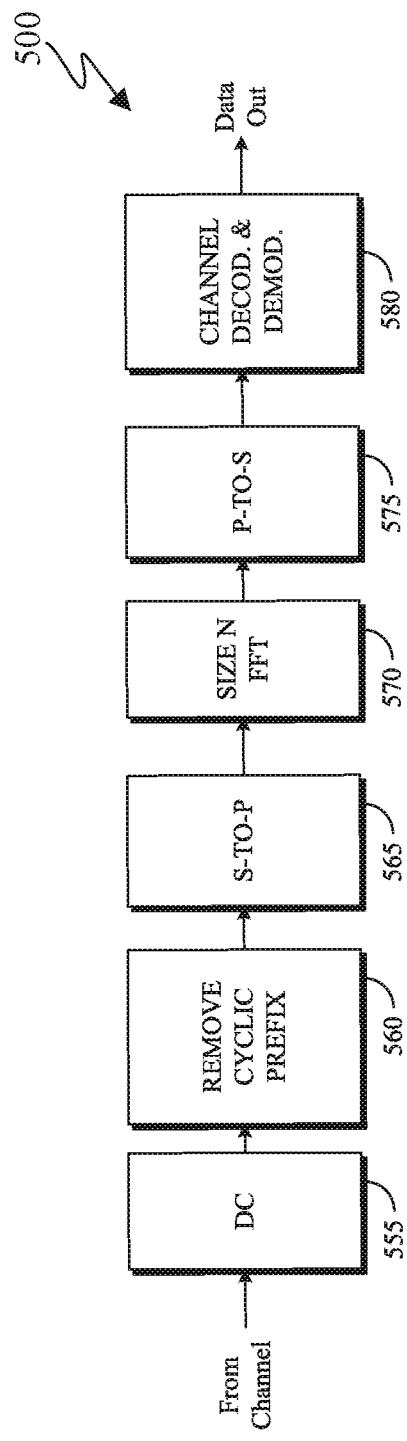

FIG. 4 and FIG. 5 illustrate example wireless transmit and receive paths according to this disclosure. In the following description, a transmit path 400, of FIG. 4, may be described as being implemented in a gNB (such as the gNB 102), while a receive path 500, of FIG. 5, may be described as being implemented in a UE (such as a UE 116). However, it may be understood that the receive path 500 can be implemented in a gNB and that the transmit path 400 can be implemented in a UE. In some embodiments, the receive path 500 is configured to support reception of a PUCCH with multicast HARQ-ACK information as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the gNB s 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration $\mu$ as $2^{\mu} \cdot 15$ kHz. A unit of one sub-carrier over one symbol is referred to as resource element (RE). A unit of one RB over one symbol is referred to as physical RB (PRB).

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A PDCCH transmission is over a number of control channel elements (CCEs) from a predetermined set of numbers of CCEs referred to as CCE aggregation level within a control resource set (CORESET). A PDSCH transmission is scheduled by a DCI format or is semi-persistently scheduled (SPS) as configured by higher layers and activated by a DCI format. A PDSCH reception by a UE provides one or more transport blocks (TB s), wherein a TB is associated with a hybrid automatic repeat request (HARQ) process that is indicated by a HARQ process number field in a DCI format scheduling the PDSCH reception or activating a SPS PDSCH reception. A TB transmission can be an initial one or a retransmission as identified by a new data indicator (NDI) field in the DCI format scheduling a PDSCH reception that provides a TB retransmission for a given HARQ process number. A DCI format can be a DCI format 1_0, a DCI format 1_1, or a DCI format 1_2 for unicast PDSCH receptions, or a DCI format 4_1 or DCI format 4_2 for multicast PDSCH receptions, as described in TS 38.212 v17.1.0 "NR; Multiplexing and Channel coding".

A gNB transmits one or more of multiple types of RS including channel state information RS (CSI-RS) and demodulation RS (DMRS)—see also TS 38.211 v17.1.0 "NR; Physical channels and modulation". A CSI-RS is primarily intended for UEs to perform measurements and provide channel state information (CSI) to a gNB. For channel measurement or for time tracking, non-zero power CSI-RS (NZP CSI-RS) resources are used. For interference measurement reports (IMRs), CSI interference measurement (CSI-IM) resources are used (see also TS 38.213 v17.1.0 "NR; Physical Layer Procedures for Control"). The CSI-IM resources can also be associated with a zero power CSI-RS (ZP CSI-RS) configuration. A UE can determine CSI-RS reception parameters through DL control signaling or higher layer signaling, such as radio resource control (RRC) signaling from a gNB (see also TS 38.331 v16.5.0 "NR; Radio Resource Control (RRC) Protocol Specification"). A DMRS is typically transmitted only within a BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access (see also TS 38.211 v17.1.0 "NR; Physical channels and modulation"). A UE transmits data information or UCI through a respective physical UL shared channel (PUSCH) or a physical UL control channel (PUCCH). A PUSCH or a PUCCH can be transmitted over a variable number of symbols in a slot including one symbol. When a UE simultaneously transmits data information and UCI, the UE can multiplex both in a PUSCH or, depending on a UE capability, transmit both a PUSCH with data information and a PUCCH with UCI at least when the transmissions are on different cells. A DCI format scheduling a PUSCH transmission can be a DCI format 0_0, a DCI format 0_1, or a DCI format 0_2 as described in TS 38.212 v17.1.0 "NR; Multiplexing and Channel coding".

UCI includes hybrid automatic repeat request acknowledgement (HARQ-ACK) information, indicating correct or incorrect decoding of transport blocks (TBs) or of code block groups (CBGs) in a PDSCH, scheduling request (SR) indicating whether a UE has data in its buffer to transmit, and CSI reports enabling a gNB to select appropriate parameters for PDSCH/TB or PDCCH/DCI format transmissions to a UE. A UE transmits a PUCCH on a primary cell of a cell group. HARQ-ACK information is either a positive acknowledgement (ACK) when a TB decoding is correct or a negative acknowledgement (NACK) when a TB decoding is incorrect. An ACK can be represented by a binary '1' value and a NACK can be represented by a binary '0' value. A UE multiplexes HARQ-ACK information in a slot indicated by a value of PDSCH-to-HARQ_feedback timing indicator field in the DCI format, from a set of slot timing values $K_1$, or indicated by higher layers. The UE does not transmit more than one PUCCH with HARQ-ACK information in a slot unless the UE is configured transmissions to two transmission-reception points (TRPs) as identified by two respective values of 0 and 1 for a higher layer parameter CORESETPoolIndex associated with CORESETs where a UE receives PDCCH and a value of 0 is assumed for a CORESET when CORESETPoolIndex is not provided for the CORESET as described in TS 38.213 v17.1.0 "NR; Physical Layer Procedures for Control".

UL RS includes DMRS and SRS. DMRS is typically transmitted within a BW of a respective PUSCH or PUCCH. A gNB can use a DMRS to demodulate information in a respective PUSCH or PUCCH. SRS is transmitted by a UE to provide a gNB with an UL CSI and, for a TDD system, to also provide a PMI for DL transmission. Further, as part of a random access procedure or for other purposes, a UE can transmit a physical random access channel (PRACH).

DL receptions and UL transmissions by a UE can be configured to occur in a corresponding DL bandwidth part (BWP) and UL BWP. A DL/UL BWP is smaller than or equal to a DL/UL bandwidth of a serving cell. Multicast (or groupcast) PDSCH receptions can occur in a common frequency region for a group of UEs, wherein the common frequency region is within an active DL BWP for each UE from the group of UEs. DL transmissions from a gNB and UL transmissions from a UE can be based on an orthogonal frequency division multiplexing (OFDM) waveform including a variant using DFT preceding that is known as DFT-spread-OFDM (see also TS 38.211 v17.1.0 "NR; Physical channels and modulation").

Figure 6:
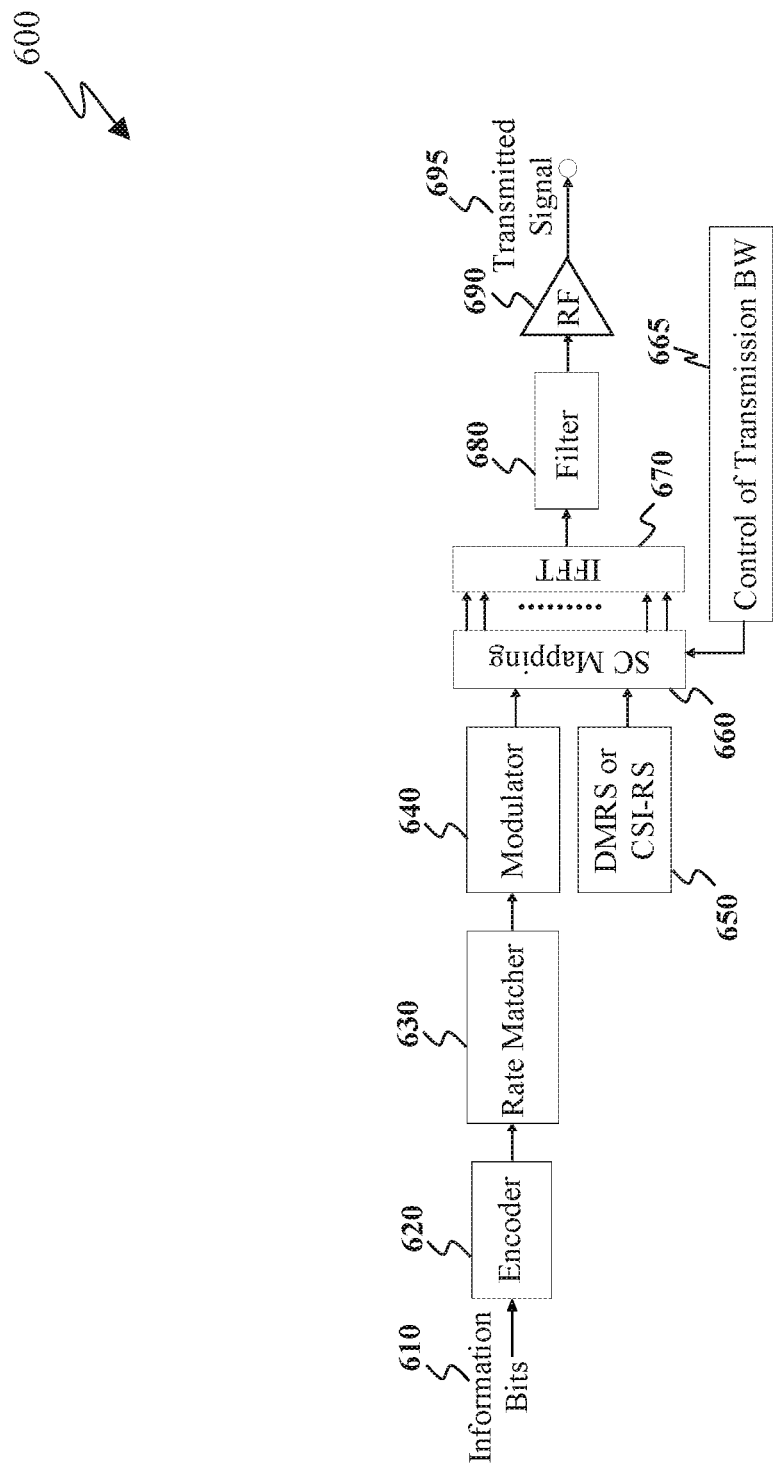
FIG. 6 illustrates an example transmitter structure using orthogonal frequency-division multiplexing (OFDM) according to embodiments of the present disclosure.

FIG. 6 illustrates an example transmitter structure using OFDM 600 according to embodiments of the present disclosure. The embodiment of the transmitter structure using OFDM 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the transmitter structure using OFDM 600.

As shown in FIG. 6, information bits, such as DCI bits or data bits 610, are encoded by encoder 620, rate matched to assigned time/frequency resources by rate matcher 630, and modulated by modulator 640. Subsequently, modulated encoded symbols and DMRS or CSI-RS 650 are mapped to SCs 660 by SC mapping unit 465, an inverse fast Fourier transform (IFFT) is performed by filter 670, a cyclic prefix (CP) is added by CP insertion unit 680, and a resulting signal is filtered by filter 690 and transmitted by a radio frequency (RF) unit 695.

Figure 7:
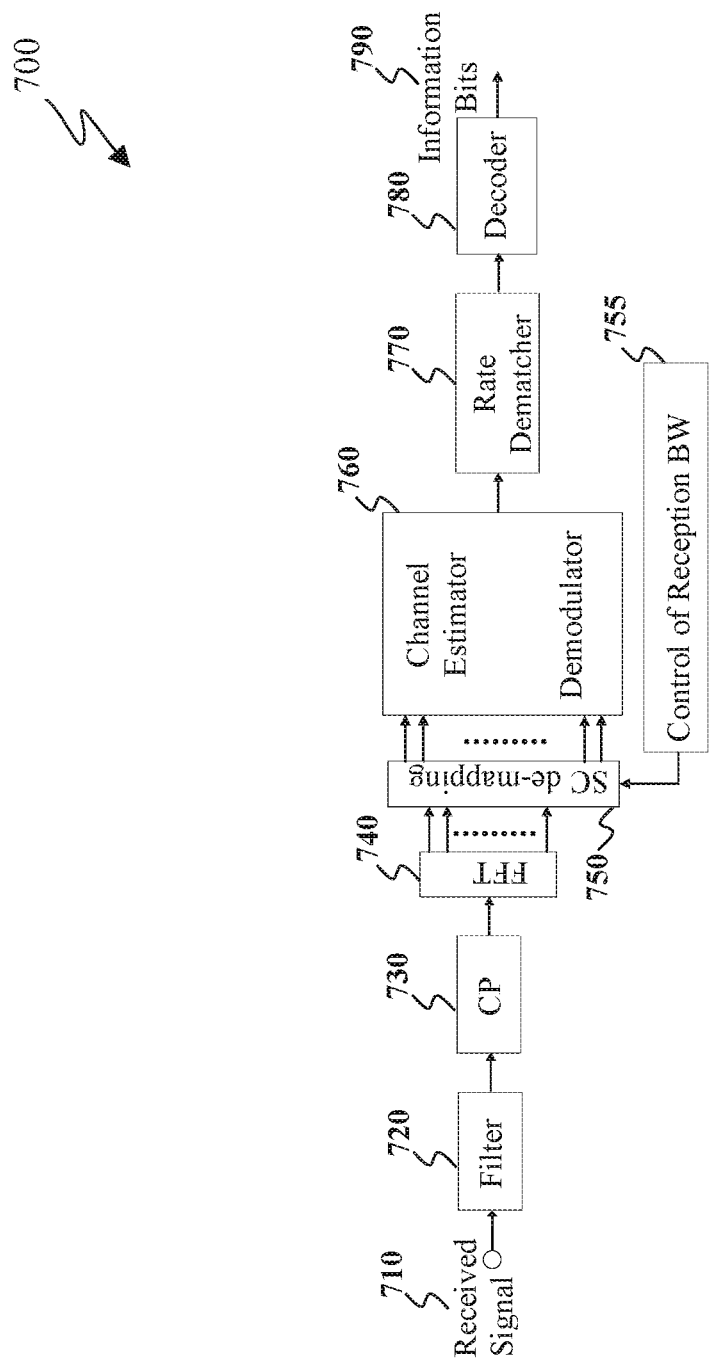
FIG. 7 illustrates an example receiver structure using OFDM according to embodiments of the present disclosure.

FIG. 7 illustrates an example receiver structure using OFDM 700 according to embodiments of the present disclosure. The embodiment of the receiver structure using OFDM 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the receiver structure using OFDM 700.

As shown in FIG. 7, a received signal 710 is filtered by filter 720, a CP removal unit removes a CP 730, a filter 740 applies a fast Fourier transform (FFT), SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

A UE may need to report HARQ-ACK information in response to correct or incorrect decoding of a DCI format together with HARQ-ACK information in response to correct of incorrect decoding of TBs. For example, the HARQ-ACK information for a decoding of a DCI format can be for a DCI format indicating an SPS PDSCH activation/release or for a DCI format indicating a dormant/non-dormant BWP for a cell from a group of cells, and so on, as described in TS 38.213 v17.1.0 "NR; Physical Layer Procedures for Control".

A serving gNB can provide by higher layer signaling to a UE a number of PUCCH resource sets for the UE to determine a PUCCH resource set and a PUCCH resource from the PUCCH resource set for transmission of a PUCCH with HARQ-ACK information as described in TS 38.213 v17.1.0 "NR; Physical Layer Procedures for Control". For example, the gNB can provide by PUCCH-ResourceSet, or by SPS-PUCCH-AN-List for SPS PDSCH receptions, in PUCCH-Config a set of PUCCH resources or a list of PUCCH resources, respectively, for transmission of a PUCCH with the HARQ-ACK information. To enable flexible allocation of PUCCH resources, a PUCCH resource indicator (PRI) field can be included in a DCI format and a UE can then determine a PUCCH resource based on a value of the PRI field in a last DCI format that the UE correctly decodes. The last DCI format is provided by a PDCCH reception that starts after all other PDCCH receptions providing DCI formats with corresponding HARQ-ACK information multiplexed in a same PUCCH. In case there are multiple PDCCH receptions with a same last symbol that provide DCI formats scheduling PDSCH receptions on respective multiple cells, the last PDCCH reception is the one corresponding to a cell from the multiple cells with a largest cell index as described in TS 38.213 v17.1.0 "NR; Physical Layer Procedures for Control". When the DCI formats indicate a priority for the HARQ-ACK information, the last DCI format is among DCI formats indicating a same priority.

A PDSCH reception can be only by a single UE and is then referred to as unicast PDSCH reception or can be by a group of UEs and is then referred to as multicast (or groupcast) PDSCH reception. For example, the determination can be based on a RNTI used to scramble a CRC of a DCI format scheduling the PDSCH reception or activating SPS PDSCH receptions. For unicast PDSCH receptions, the RNTI can be a cell-RNTI (C-RNTI), a configured scheduling (CS-RNTI), or an MCS-C-RNTI. For multicast PDSCH receptions, the RNTI can be a group RNTI (G-RNTI) or a G-CS-RNTI. HARQ-ACK information in response to unicast PDSCH receptions or in response to DCI formats with CRC scrambled by C-RNTI, CS-RNTI, or MCS-C-RNTI (unicast DCI formats) is referred to as unicast HARQ-ACK information and, together with SR or CSI, can be referred to as unicast UCI. HARQ-ACK information in response to multicast PDSCH receptions or in response to DCI formats with CRC scrambled by G-RNTI, G-CS-RNTI (multicast DCI formats) is referred to as multicast HARQ-ACK information.

A UE can be configured to receive both unicast PDSCH and multicast PDSCH. For example, a DCI format scheduling a multicast PDSCH reception uses a G-RNTI and can have a same size as a DCI format 1_0 or, in general as a DCI format with CRC scrambled by a C-RNTI, or as a DCI format 2_x, where for example x=0, . . . 6, as they are described in TS 38.212 v17.1.0 "NR; Multiplexing and Channel coding". More than one DCI formats with respective different sizes can be used to schedule multicast PDSCH receptions or to activate/release multicast SPS PDSCH receptions. Multicast PDCCH or PDSCH receptions by a UE are within a common frequency region (CFR) that is included in an active DL BWP of the UE. The descriptions consider the active DL BWP and the active UL BWP for unicast signaling, and the CFR for multicast signaling.

A UE can be provided by higher layers a first information element (IE) PUCCH-Config providing parameters for a PUCCH transmission with unicast UCI, such as HARQ-ACK information associated with a DCI format with CRC scrambled by a C-RNTI, SR, or CSI, and a second IE PUCCH-Config providing parameters for a PUCCH transmission with HARQ-ACK information (and possibly CSI) associated with a DCI format with CRC scrambled by a G-RNTI. When the second IE PUCCH-Config is not provided, PUCCH resources associated with multicast HARQ-ACK information can also be provided by the first IE PUCCH-Config.

A HARQ-ACK information report can be based on one of several codebook types such as a Type-1 HARQ-ACK codebook or a Type-2 HARQ-ACK codebook or a Type-3 HARQ-ACK codebook as described in TS 38.213 v17.1.0 "NR; Physical Layer Procedures for Control". When a UE is configured a Type-1 HARQ-ACK codebook and the UE reports HARQ-ACK information in a PUCCH only for a PDSCH reception scheduled by DCI format 1_0, or by DCI format 4_1 having enabled associated HARQ-ACK information report, with counter downlink assignment indicator (DAI) field value of 1 on the primary cell (PCell), within a set of occasions for candidate PDSCH receptions, the UE provides HARQ-ACK information only for the PDSCH reception. That operation may also be referred to as "fallback operation" for the Type-1 HARQ-ACK codebook and can also depend on under other conditions. A UE may also be configured to receive multicast PDSCH only on a secondary cell (SCell). Then, under current conditions for fallback operation, the UE cannot provide HARQ-ACK information for a Type-1 HARQ-ACK codebook based on the fallback operation even though the UE may often receive only one PDSCH scheduled by a DCI format 4_1 with counter DAI field value of 1 on the SCell and could provide HARQ-ACK information only for the one PDSCH.

HARQ-ACK information reports from a UE can be disabled by higher layer signaling or by a DCI format scheduling an associated PDSCH reception or activation/release of SPS PDSCH receptions. The indication for disabling a HARQ-ACK information report can also be per RNTI, including per G-RNTI in case of multiple G-RNTI(s), or per SPS PDSCH configuration.

In order to avoid a substantial increase in PUCCH overhead that would result when many or all UEs receiving multicast PDSCHs provide corresponding HARQ-ACK information in respective PUCCHs, a serving gNB can configure a UE to transmit corresponding PUCCH only when the UE incorrectly decodes/receives at least one TB in a corresponding multicast PDSCH in order to indicate a respective NACK (referred to as NACK-only mode, or second mode, for HARQ-ACK reports). A PUCCH resource corresponding to a combination of HARQ-ACK values, where at least one HARQ-ACK value is a NACK, can be shared among UEs and the serving gNB can perform energy detection to determine a PUCCH transmission using the PUCCH resource and therefore determine incorrect decoding/reception of one or more TBs associated with the PUCCH resource from one or more UEs. For example, a UE can be provided 15 PUCCH resources to select from in order to transmit a PUCCH where the 15 PUCCH resources have a one-to-one mapping with the 15 combinations of four {ACK, NACK} values, excluding the case of 4 ACK values. For example, for a PUCCH transmission, the UE can use a first PUCCH resource to indicate {NACK, NACK, NACK, NACK}, a second PUCCH resource to indicate {ACK, NACK, NACK, NACK}, a third PUCCH resource to indicate {NACK, ACK, NACK, NACK}, and so on. A PUCCH format 0, or a PUCCH format 1 where all symbols are unmodulated (or, equivalently, use BPSK modulation with a numeric bit value of 1), as described in TS 38.213 v17.1.0 "NR; Physical Layer Procedures for Control", can be used for the PUCCH transmission.

A gNB can configure a UE to provide HARQ-ACK reports according to an ACK/NACK mode (referred to as first mode), where the UE provides individual bits wherein each bit has an ACK or NACK value, for a first number of G-RNTIs of G-CS-RNTIs, and according to a NACK-only mode (second mode) for a second number of G-RNTIs of G-CS-RNTIs. For example, a G-RNTI from the first G-RNTIs can be associated with a small number of UEs and a small number of HARQ-ACK bits, such as up to 2, and then the ACK/NACK reporting mode may not result to a large overhead of UL resources for HARQ-ACK reporting. For example, a G-RNTI from the second G-RNTIs can be associated with a large number of UEs or a large number of HARQ-ACK bits, such as more than two, and the NACK-only reporting mode may be needed to avoid a large overhead of UL resources for HARQ-ACK reporting. As the number of PUCCH resources required for HARQ-ACK reporting according to the NACK-only mode increases exponentially with the number of HARQ-ACK bits, such as 1, 3, 7, 15, 31 resources for 1, 2, 3, 4, 5 HARQ-ACK bits, the NACK-only mode may not be supported when the number of HARQ-ACK bits is larger than a configured or predetermined number, such as 4, and for larger numbers of HARQ-ACK bits a UE uses resources associated with the ACK/NACK reporting mode.

When a UE would transmit a first PUCCH that would overlap in time with a number of second PUCCHs or with a number of PUSCHs, the UE multiplexes all UCI in a PUCCH or in a PUSCH, respectively, when certain timeline conditions are fulfilled and when simultaneous PUSCH and PUCCH transmissions are not supported, as described in TS 38.213 v17.1.0 "NR; Physical Layer Procedures for Control". The sequence of {ACK, NACK} values is then converted to individual HARQ-ACK information bits. When the UE is configured to report HARQ-ACK according to a NACK-only mode based on a PUCCH resource selection, a serving gNB may not know in advance the PUCCH resource that a UE selects as the gNB does not know the values of the reported HARQ-ACK information and therefore the gNB may not be able to determine whether or not the first PUCCH would overlap in time with the number of second PUCCHs or with the number of PUSCHs. Moreover, when the HARQ-ACK information has all ACK values, the UE would not transmit the first PUCCH (DTX) but the gNB may not be aware of such dropped PUCCH transmission by the UE and may not be able to know the contents of a PUCCH reception or of a PUSCH reception, due to tie as it may not know whether it includes HARQ-ACK information from the first PUCCH.

When a UE would transmit a first PUCCH having a first priority that would overlap in time with a number of second PUCCHs or with a number of PUSCHs having a second priority that is different than the first priority, and the UE is not able to multiplex UCI with different priorities in a same PUCCH or UCI and data with different priorities in a same PUSCH, the UE drops the first PUCCH transmission when the first priority is smaller than the second priority; otherwise, the UE drops the transmission of the second PUCCHs or of the PUSCH. Similar to the case when the UE resolves time overlapping by multiplexing UCI from the first PUCCH in a PUCCH or in a PUSCH, the gNB may not know in advance whether dropped transmissions occur as the gNB may not know in advance whether the overlapping occurs as the gNB does not know the resource that the UE uses for the first PUCCH since the resource depends on the values of the HARQ-ACK bits indicated by the PUCCH through the selection of the resource. The gNB also does not know whether the UE would transmit the first PUCCH as that would require at least one of the indicated HARQ-ACK values to be NACK.

A UE may be indicated to provide first HARQ-ACK information for multicast PDSCH receptions that are scheduled by a multicast DCI format and second HARQ-ACK information for multicast SPS PDSCH receptions in a slot. The first HARQ-ACK information can be according to a different mode than the second HARQ-ACK information. Certain HARQ-ACK information, such as HARQ-ACK information corresponding to SPS PDSCH release, can be according to the ACK/NACK mode. The UE then needs to determine a PUCCH resource for a PUCCH transmission in the slot that includes both the first and second HARQ-ACK information.

Various embodiments of the present disclosure recognize that there is a need to enable a UE configured to provide multicast HARQ-ACK information according to a Type-1 HARQ-ACK codebook to operate with a fallback mode when the UE receives multicast PDSCHs only on an SCell.

Various embodiments of the present disclosure recognize that there is another need to enable a common understanding between a serving gNB and a UE for resolving collisions among a first PUCCH with HARQ-ACK information according to a NACK-only mode and second PUCCHs or PUSCHs with same or different priority values.

Various embodiments of the present disclosure recognize that there is another need to define a procedure for resolving collisions among a first PUCCH with HARQ-ACK information according to a NACK-only mode and with a first priority value and second PUCCHs or PUSCHs with second priority value that is smaller than the first priority value when the HARQ-ACK information includes only ACK values.

Various embodiments of the present disclosure recognize that there is another need to determine a resource for a PUCCH transmission with first HARQ-ACK information associated with multicast PDSCH receptions scheduled by DCI formats and second HARQ-ACK information associated with multicast SPS PDSCH receptions.

Accordingly, various embodiments of the present disclosure provide a mechanism to enable a UE configured to provide multicast HARQ-ACK information according to a Type-1 HARQ-ACK codebook to operate with a fallback mode when the UE receives multicast PDSCHs only on an SCell. Various embodiments of the present disclosure provide a mechanism to enable a common understanding between a serving gNB and a UE for resolving collisions among a first PUCCH with HARQ-ACK information according to a NACK-only mode and second PUCCHs or PUSCHs with same or different priority values. Various embodiments of the present disclosure provide a mechanism for defining a procedure for resolving collisions among a first PUCCH with HARQ-ACK information according to a NACK-only mode and with a first priority value and second PUCCHs or PUSCHs with second priority value that is smaller than the first priority value when the HARQ-ACK information includes only ACK values. Various embodiments of the present disclosure provide a mechanism for determining a resource for a PUCCH transmission with first HARQ-ACK information associated with multicast PDSCH receptions scheduled by DCI formats and second HARQ-ACK information associated with multicast SPS PDSCH receptions.

HARQ-ACK information can be for PDSCH receptions scheduled by DCI formats, or for SPS PDSCH receptions, or for a SPS PDSCH release, or for detection of a DCI format that does not schedule a PDSCH reception or a PUSCH transmission and instead provides an indication as described in TS 38.213 v17.1.0 "NR; Physical Layer Procedures for Control".

In the following DCI formats and associated TBs in PDSCH receptions that have CRC scrambled by a C-RNTI or CS-RNTI are referred to as unicast DCI formats, or unicast TBs, or unicast PDSCHs, and associated HARQ-ACK information/codebooks is referred to as unicast HARQ-ACK information/codebooks. DCI formats and associated TBs in PDSCH receptions that have CRC scrambled by a G-RNTI or G-CS-RNTI are referred to as multicast DCI formats, or multicast TBs, or multicast PDSCHs, and associated HARQ-ACK information/codebooks is referred to as multicast HARQ-ACK information/codebooks.

In the following, HARQ-ACK codebooks are considered for multicast HARQ-ACK information associated with one or more G-RNTIs, or for unicast HARQ-ACK information, but the embodiments are applicable to any type of HARQ-ACK information associated with separate generation of corresponding HARQ-ACK codebooks.

The term "higher layers" is used to denote control information that a UE is provided in a PDSCH reception, such as radio resource control (RRC) or a medium access control (MAC) control element (CE).

In one embodiment, a fallback operation for HARQ-ACK reports associated with multicast PDSCH receptions in case of Type-1 HARQ-ACK codebook configuration is considered.

When a UE is configured a secondary cell (SCell) for unicast PDSCH receptions, and the SCell is activated and has a non-dormant active DL BWP for the UE, the UE can receive unicast PDSCH both on the primary cell (PCell) and on the SCell. The fallback operation for unicast PDSCH receptions applies only when the UE receives PDSCH scheduled by DCI format 1_0 with counter DAI field value of 1 on the PCell while the UE reports the whole Type-1 HARQ-ACK codebook when the same event occurs on an SCell. A reason for the restriction of the PCell is that, when there is only one unicast PDSCH reception that the UE needs to provide corresponding HARQ-ACK information, the PDSCH reception is likely to be on the PCell as a PDSCH reception on the PCell is typically scheduled when a PDSCH reception on an SCell is also scheduled in a same slot and therefore, when the UE receives only one PDSCH on the SCell, it is likely that the UE missed scheduling of a PDSCH reception on the PCell and then a HARQ-ACK report would be incorrect if fallback was to apply.

When a UE is configured a SCell for multicast PDSCH receptions, and the SCell is activated and has a non-dormant active DL BWP for the UE, the UE can receive multicast PDSCH only on the SCell as CA operation may not be supported for multicast PDSCH while the UE can be configured to receive multicast PDSCH only on the SCell in order to offload corresponding traffic from the PCell. Then, fallback operation for multicast PDSCH receptions applies when the UE receives PDSCH scheduled by DCI format 4_1 with counter DAI field value of 1 on the SCell.

Therefore, if a UE reports HARQ-ACK information in a PUCCH only for a PDSCH reception scheduled by DCI format 1_0 with counter DAI field value of 1 on the PCell, or only for a PDSCH reception scheduled by DCI format 4_1 having enabled associated HARQ-ACK information report with counter DAI field value of 1, within a corresponding set of occasions for a Type-1 HARQ-ACK codebook, the UE provides HARQ-ACK information only for the PDSCH reception. Otherwise, the UE follows the procedure for providing the Type-1 HARQ-ACK codebook as described in TS 38.213 v17.1.0 "NR; Physical Layer Procedures for Control".

Figure 8:
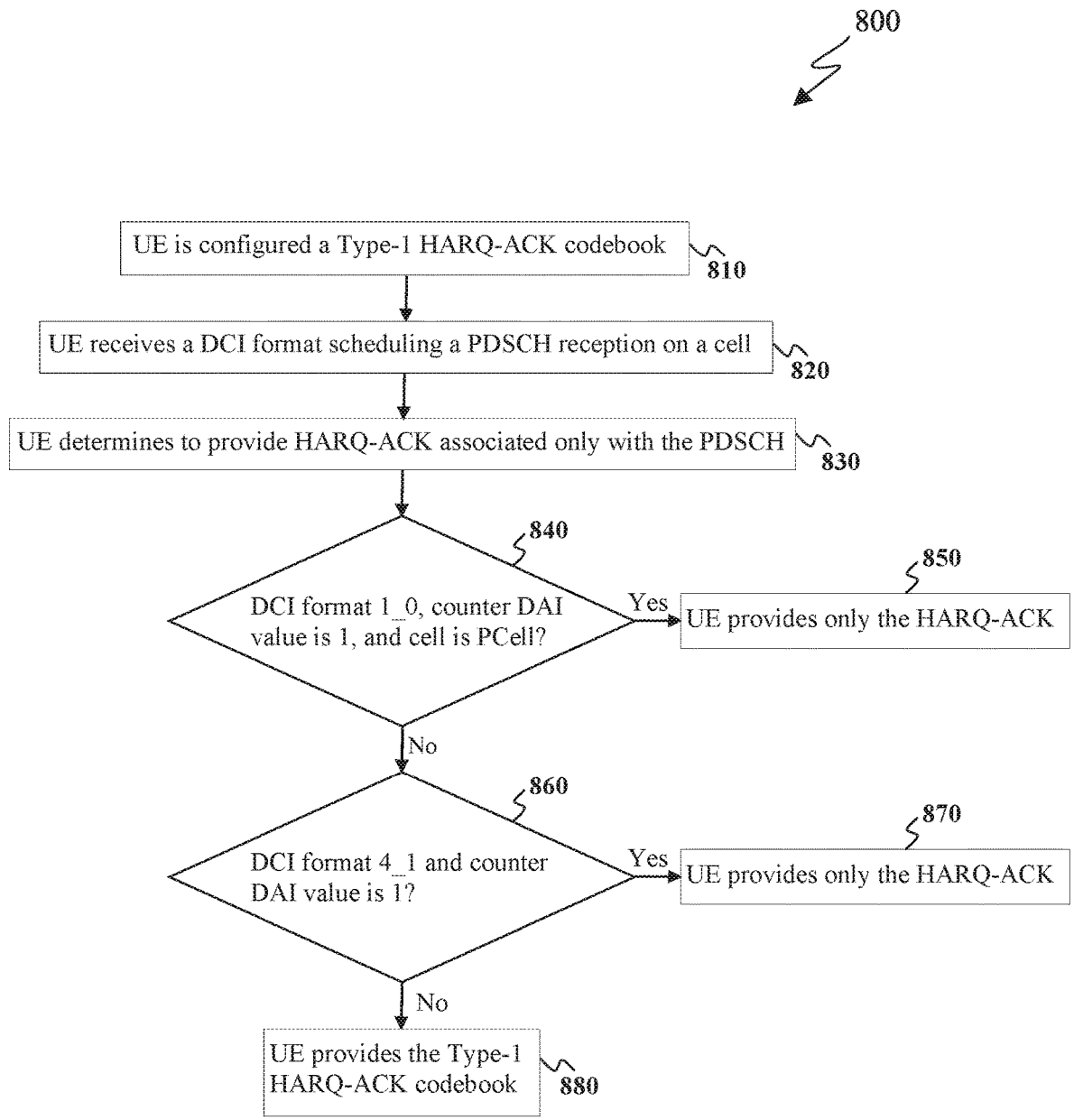
FIG. 8 illustrates an example method for a UE to determine a multicast HARQ-ACK information report when the UE is configured to provide multicast HARQ-ACK information based on a Type-1 HARQ-ACK codebook according to embodiments of the present disclosure.

FIG. 8 illustrates an example method 800 for a UE to determine a multicast HARQ-ACK information report when the UE is configured to provide multicast HARQ-ACK information based on a Type-1 HARQ-ACK codebook according to embodiments of the present disclosure. The embodiment of the method 800 illustrated in FIG. 8 is for illustration only. FIG. 8 does not limit the scope of this disclosure to any particular implementation of the method 800.

As illustrated in FIG. 8, the method 800 starts at step 810, where a UE (such as the UE 116) is configured to provide HARQ-ACK information according to a Type-1 HARQ-ACK codebook. At step 820, the UE receives a DCI format scheduling a PDSCH reception on a cell. At step 830, the UE determines to provide HARQ-ACK information associated only with the PDSCH reception in a PUCCH. When the DCI format is a unicast DCI format 1_0, has a value of a counter DAI field equal to 1, and the cell is the PCell 840, the UE provides only the HARQ-ACK information 850; otherwise, when the DCI format is a multicast DCI format 4_1 and has a value of a counter DAI field equal to 1 860, the UE provides only the HARQ-ACK information 870; otherwise, the UE provides the Type-1 HARQ-ACK codebook 880.

In one embodiment, procedures to resolve time overlapping among a first PUCCH with HARQ-ACK information according to a NACK-only mode and second PUCCHs or PUSCHs with same or different priority values are considered.

In a first alternative for establishing a common understanding between a serving gNB and a UE for when the first PUCCH overlaps in time with the second PUCCHs or PUSCHs, all resources for the first PUCCH have same symbols. Then, for any combination of values for the HARQ-ACK bits that are indicated through a selection of a resource for the first PUCCH, the gNB can deterministically know whether or not the first PUCCH would overlap in time with the second PUCCHs or with the PUSCH.

When all values of the HARQ-ACK information bits that are to be provided by the first PUCCH are ACK, and a corresponding indication is via discontinuing/dropping the first PUCCH transmission (DTX), the UE can resolve a time overlapping between the first PUCCH and the second PUCCHs or PUSCHs by considering any PUCCH resource as a virtual PUCCH resource for the dropped first PUCCH transmission. If there would be time overlapping between the first PUCCH and the second PUCCHs or the PUSCHs and the corresponding priority values are same, the UE multiplexes the HARQ-ACK information bits having all ACK values in a PUCCH or a PUSCH. If there would not be time overlapping between the first PUCCH and the second PUCCHs or the PUSCHs, the UE does not transmit the first PUCCH and does not multiplex the HARQ-ACK information bits having all ACK values in any PUCCH or PUSCH.

Figure 9:
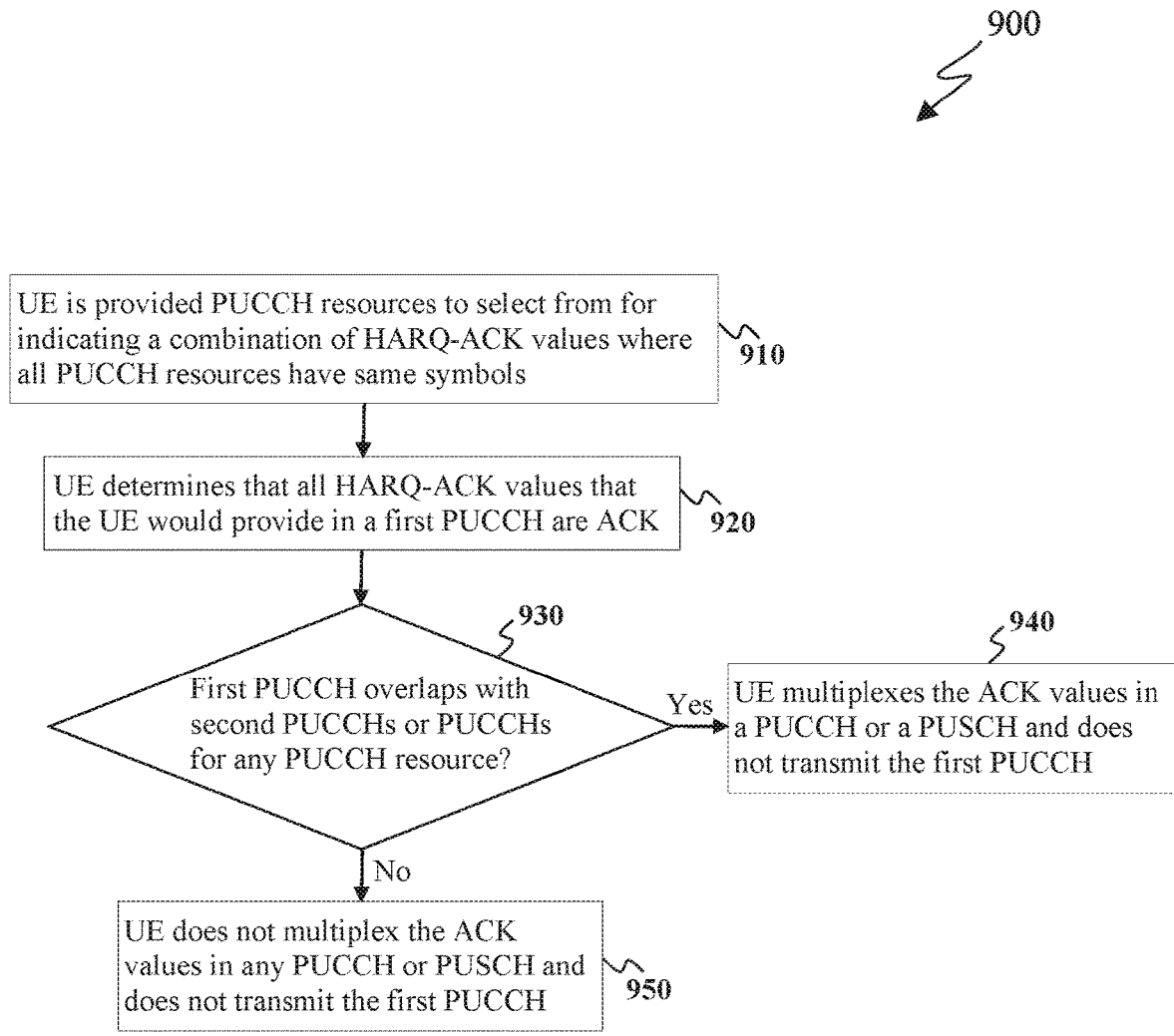
FIG. 9 illustrates an example method for a gNB to configure PUCCH resources to a UE for a first PUCCH with HARQ-ACK information based on a NACK-only mode and for determining an overlapping with second PUCCHs or PUSCHs according to embodiments of the present disclosure.

FIG. 9 illustrates an example method 900 for a gNB to configure PUCCH resources to a UE for a first PUCCH with HARQ-ACK information based on a NACK-only mode and for determining an overlapping with second PUCCHs or PUSCHs according to embodiments of the present disclosure. The embodiment of the method 900 illustrated in FIG. 9 is for illustration only. FIG. 9 does not limit the scope of this disclosure to any particular implementation of the method 900.

As illustrated in FIG. 9, the method 900 begins at step 910, where a UE (such as the UE 116) is provided by a gNB with PUCCH resources to select from for indicating a combination of HARQ-ACK values according to a NACK-only HARQ-ACK reporting mode, where all PUCCH resources have same symbols. At step 920, the UE determines that all HARQ-ACK values that the UE would provide in a first PUCCH are ACK. At step 930, the UE determines whether the first PUCCH overlaps in time with the second PUCCHs or the PUCCHs by assuming any PUCCH resource from the PUCCH resources. When the first PUCCH overlaps in time with the second PUCCHs or the PUCCHs, the UE multiplexes the ACK values in a PUCCH or a PUSCH and does not transmit the first PUCCH 940; otherwise, the UE does not multiplex the ACK values in any PUCCH or PUSCH and the UE does not transmit the first PUCCH 950.

When the first PUCCH has a larger priority value than the second PUCCHs or PUSCHs, the first PUCCH overlaps in time with the second PUCCHs or PUSCHs, and the UE does not multiplex HARQ-ACK of larger priority value in a PUCCH or PUSCH of smaller priority value, a procedure needs to be defined for the gNB to know whether or not the UE drops transmission of the second PUCCHs or of the PUSCHs when all HARQ-ACK values that the UE would provide by the first PUCCH are ACK and the UE does not transmit the first PUCCH.

In one approach, the UE drops transmission of the second PUCCHs or PUSCHs even when the UE does not transmit the first PUCCH in order to provide a uniform UE behavior regarding the transmission of the second PUCCHs or PUSCHs regardless of the values of the HARQ-ACK information bits that are indicated by the first PUCCH (all ACK are indicated in case of DTX for the first PUCCH). In a variation of the first approach, when all PUCCH resources for the first PUCCH do not include same symbols, the UE can consider a reference PUCCH resource, such as the PUCCH resource corresponding to all-NACK values, to determine whether or not the first PUCCH would overlap in time with the second PUCCHs or PUSCHs.

Figure 10:
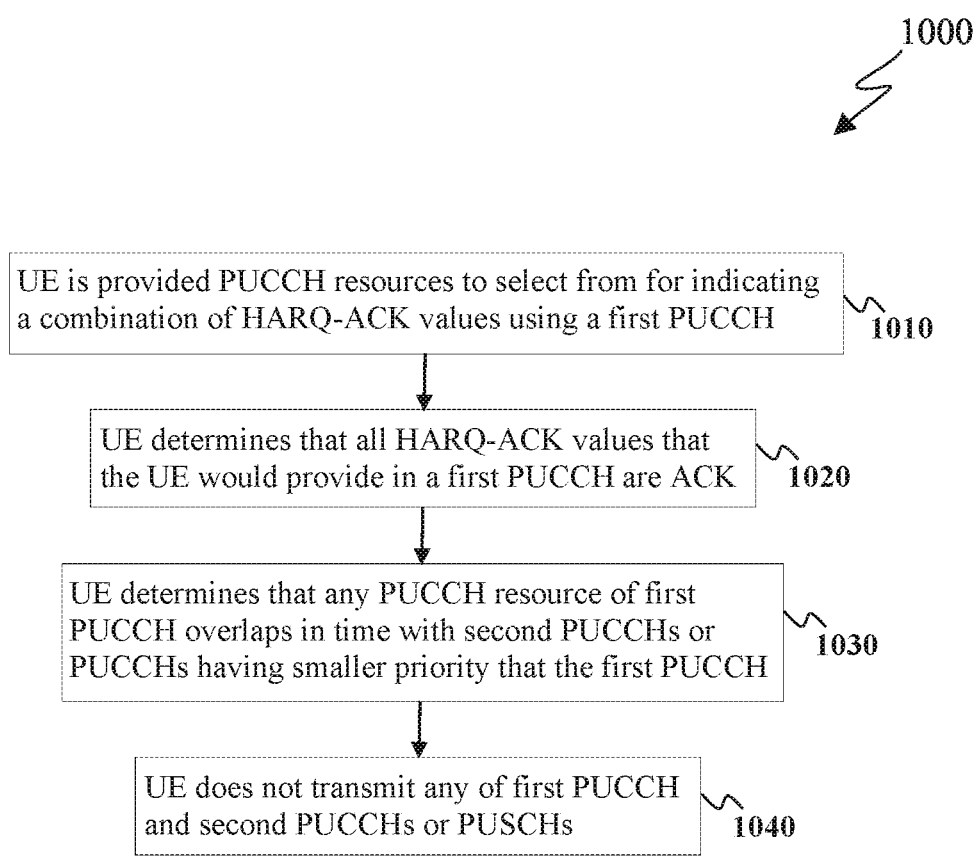
FIG. 10 illustrates an example method for a UE to resolve a time overlapping among a first PUCCH with HARQ-ACK information based on a NACK-only mode and having a priority value with second PUCCHs or PUSCHs having priority values smaller than the priority value, when all HARQ-ACK information values are ACK, according to embodiments of the present disclosure.

FIG. 10 illustrates an example method 1000 for a gNB to configure PUCCH resources to a UE for a first PUCCH with HARQ-ACK information based on a NACK-only mode and for determining an overlapping with second PUCCHs or PUSCHs according to embodiments of the present disclosure. The embodiment of the method 1000 illustrated in FIG. 10 is for illustration only. FIG. 10 does not limit the scope of this disclosure to any particular implementation of the method 1000.

As illustrated in FIG. 10, the method 1000 begins at step 1010, where a UE (such as the UE 116) is provided by a gNB with PUCCH resources to select from for indicating a combination of HARQ-ACK values according to a NACK-only HARQ-ACK reporting mode, where all PUCCH resources have same symbols. At step 1020, the UE determines that all HARQ-ACK values that the UE would provide in a first PUCCH are ACK. At step 1030, the UE determines that any PUCCH resource from the PUCCH resources for the first PUCCH overlaps in time with the second PUCCHs or the PUCCHs, wherein the priority of the first PUCCH is larger than a priority of the second PUCCHs or PUSCHs. At step 1040, the UE does not transmit any of the first PUCCH and the second PUCCHs or PUSCHs.

In one approach, the UE transmits the second PUCCHs or PUSCHs when the UE would not transmit the first PUCCH (all HARQ-ACK values are ACK) regardless of whether or not any PUCCH resource from the PUCCH resources for the first PUCCH overlaps in time with the second PUCCHs or PUSCHs. The UE does not transmit the second PUCCHs or PUSCHs when the UE transmits the first PUCCH to indicate HARQ-ACK values that are not all ACK values using a resource that overlaps in time with the second PUCCHs or PUSCHs. The UE transmits the second PUCCHs or PUSCHs when the UE transmits the first PUCCH to indicate HARQ-ACK values that are not all ACK values using a resource that does not overlap in time with the second PUCCHs or PUSCHs. The gNB can determine whether or not the UE transmits a PUCCH or a PUSCH by performing, for example, energy detection using a DM-RS associated with the PUCCH or the PUSCH.

In one embodiment, a procedure for a UE to determine a PUCCH resource for multiplexing first multicast HARQ-ACK information that the UE would transmit in a first PUCCH according to a first mode and second multicast HARQ-ACK information that the UE would transmit in a second PUCCH according to a second mode, wherein the first and second HARQ-ACK information have same priority value is considered. The first mode corresponds to providing HARQ-ACK information with ACK or NACK value for a TB reception or for a SPS PDSCH release (ACK/NACK mode). The second mode corresponds to indicating a sequence of ACK or NACK values for respective TB receptions through a selection of a PUCCH resource for transmitting a PUCCH wherein the PUCCH is not transmitted when all values are ACK (NACK-only mode).

When the first HARQ-ACK information is associated with multicast PDSCH receptions scheduled by multicast DCI formats, or is associated with a SPS PDSCH release, and the second HARQ-ACK information is associated with multicast SPS PDSCH receptions, a PUCCH resource is the one determined based on an indication by a last multicast DCI format that the UE detects and indicates a slot for a corresponding first PUCCH transmission that is same as a slot for a second PUCCH transmission with the second HARQ-ACK information. The UE multiplexes the first and second HARQ-ACK information in the first PUCCH and does not transmit the second PUCCH.

When the second HARQ-ACK information is associated with multicast PDSCH receptions scheduled by multicast DCI formats, or is associated with a multicast SPS PDSCH release, and the first HARQ-ACK information is associated with multicast SPS PDSCH receptions, the UE determines the PUCCH resource from SPS-PUCCH-AN-List for multicast SPS PDSCH receptions (referred to as SPS-PUCCH-AN-ListMulticast). The UE multiplexes the first and second HARQ-ACK information in the first PUCCH and does not transmit the second PUCCH. The UE converts the HARQ-ACK information according to the second mode to individual bits representing ACK or NACK values according to the first mode.

Using the aforementioned determination for the PUCCH resource depending on the multicast HARQ-ACK report mode, where the PUCCH resource associated with multicast HARQ-ACK information bits corresponding to individual ACK or NACK values is selected regardless of whether it is associated/indicated by a DCI format or is provided by higher layers via SPS-PUCCH-AN-ListMulticast, provides HARQ-ACK information bits with ACK or NACK values (first mode) from a UE and, for the UE, a PUCCH resource overhead is manageable for a NW and the UE is provided PUCCH resources for HARQ-ACK reporting according to the first mode.

Figure 11:
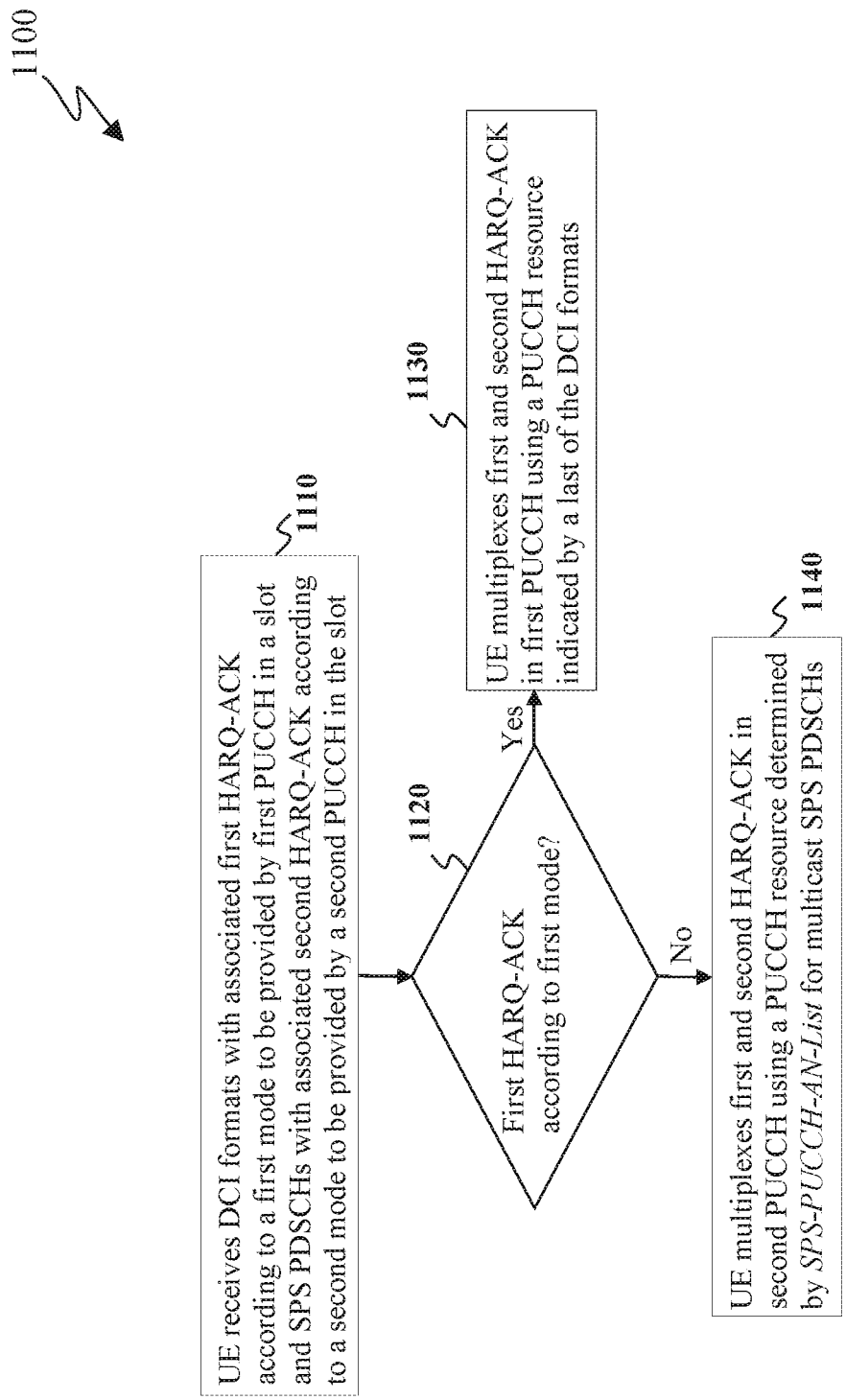
FIG. 11 illustrates an example method for a UE to determine a PUCCH resource for transmission of a PUCCH that includes first HARQ-ACK information associated with multicast DCI formats and second HARQ-ACK information associated with multicast SPS PDSCH receptions when the first and second HARQ-ACK information are based on different modes according to embodiments of the present disclosure.

FIG. 11 illustrates an example method 1100 for a UE to determine a PUCCH resource for transmission of a PUCCH that includes first HARQ-ACK information associated with multicast DCI formats and second HARQ-ACK information associated with multicast SPS PDSCH receptions when the first and second HARQ-ACK information are based on different modes according to embodiments of the present disclosure. The embodiment of the method 1100 illustrated in FIG. 11 is for illustration only. FIG. 11 does not limit the scope of this disclosure to any particular implementation of the method 1100.

As illustrated in FIG. 11, the method 1100 begins at step 1110, where a UE (such as the UE 116) receives DCI formats with associated first HARQ-ACK information to be provided by a first PUCCH in a slot and SPS PDSCHs with associated second HARQ-ACK information to be provided by a second PUCCH in the slot, wherein the first HARQ-ACK information is according to a different mode than the second HARQ-ACK information. When the first HARQ-ACK information is according to a mode corresponding to individual HARQ-ACK information bits with ACK or NACK values (first mode) 1120, the UE multiplexes the first HARQ-ACK information and the second HARQ-ACK information in the first PUCCH using a PUCCH resource indicated by a last DCI format from the DCI formats 1130; otherwise, the UE multiplexes the first HARQ-ACK information and the second HARQ-ACK information in the second PUCCH using a PUCCH resource determines the PUCCH resource from SPS-PUCCH-AN-ListMulticast for multicast SPS PDSCH receptions 1140.

When both the first multicast HARQ-ACK information and the second multicast. HARQ-ACK information are according to the second mode, where a UE transmits a PUCCH when at least one HARQ-ACK information bit has a NACK value, and the first HARQ-ACK information is associated with multicast PDSCH receptions scheduled by multicast DCI formats or is associated with a SPS PDSCH release and the second HARQ-ACK information is associated with multicast SPS PDSCH receptions, the UE can determine a PUCCH resource for multiplexing the first multicast HARQ-ACK information and the second multicast HARQ-ACK information based on an indication by a last multicast DCI format that the UE detects and indicates a slot for a corresponding first PUCCH transmission with the first HARQ-ACK information that is same as a slot for a second PUCCH with the second HARQ-ACK information. The UE multiplexes the first and second HARQ-ACK information in the first PUCCH and does not transmit the second PUCCH.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for providing hybrid automatic repeat request acknowledgement (HARQ-ACK) information, the method comprising:
receiving:
information for a set of physical uplink control channel (PUCCH) resources,
first physical downlink shared channels (PDSCHs) that provide first transport blocks (TBs), and
second PDSCHs that provide second TBs;
determining:
first HARQ-ACK information bits associated with the first TBs, wherein a value for each of the first HARQ-ACK information bits corresponds to positive acknowledgement (ACK),
second HARQ-ACK information bits associated with the second TBs, wherein one or more values of the second HARQ-ACK information bits correspond to a negative acknowledgement (NACK),
a first PUCCH resource from the set of PUCCH resources for transmission of a first PUCCH with the second HARQ-ACK information,
to provide the first HARQ-ACK information bits in a first slot when at least one PUCCH resource from the set of PUCCH resources overlaps in time with a transmission of a first physical uplink shared channel (PUSCH) in the first slot; and
to provide the second HARQ-ACK information bits in a second PUSCH in a second slot when the first PUCCH resource overlaps in time with a transmission of the second PUSCH in the second slot, and
to provide the second HARQ-ACK information bits in the first PUCCH in the second slot when the first PUCCH resource does not overlap in time with any PUSCH transmission in the second slot; and
transmitting:
the first PUSCH in the first slot, wherein the first PUSCH includes the first HARQ-ACK information bits when the at least one PUCCH resource overlaps in time with the first PUSCH, and
the second PUSCH in the second slot, wherein:
the second PUSCH includes the second HARQ-ACK information bits, and
the first PUCCH resource overlaps with the second PUSCH transmission, or
the first PUCCH in the second slot using the first PUCCH resource, wherein:
the first PUCCH includes the second HARQ-ACK information bits, and
the first PUCCH resource does not overlap in time with any PUSCH transmission in the second slot.

2. The method of claim 1, wherein all PUCCH resources from the set of PUCCH resources do not overlap in time with a transmission of a second PUCCH in the first slot.

3. The method of claim 1, wherein all PUCCH resources in the set of PUCCH resources have same symbols in a slot.

4. The method of claim 1, wherein:
the set of PUCCH resources includes a PUCCH resource for each combination of values for third HARQ-ACK information bits,
at least one value from the values corresponds to a negative acknowledgement (NACK), and
a number of the first HARQ-ACK information bits is smaller than or equal to a number of the third HARQ-ACK information bits.

5. The method of claim 1, further comprising:
receiving third PDSCHs that provide third TBs;
determining:
that all PUCCH resources from the set of PUCCH resources available for transmission of a third PUCCH with third HARQ-ACK information bits associated with the third TBs in a third slot overlap in time with a transmission of a second PUCCH in the third slot,
that a value for each of the third HARQ-ACK information bits corresponds to ACK, and
that a priority of the third HARQ-ACK information bits is higher than a priority of information bits in the second PUCCH; and
canceling transmission of the second PUCCH and of the third PUCCH in the third slot.

6. The method of claim 1, further comprising:
receiving third PDSCHs that provide third TBs;
determining:
third HARQ-ACK information bits associated with the third TBs, wherein a value for each of the third HARQ-ACK information bits corresponds to ACK, and
to provide the third HARQ-ACK information bits only when the at least one PUCCH resource overlaps in time with a transmission of a third PUCCH in a third slot; and
transmitting the third PUCCH in the third slot, wherein the PUCCH includes the third HARQ-ACK information bits when the at least one PUCCH resource overlaps in time with transmission of the third PUCCH in the third slot.

7. The method of claim 1, further comprising:
receiving:
a list of PUCCH resources,
third PDSCHs that provide third TBs, wherein the receptions of the third PDSCHs are scheduled by downlink control information (DCI) formats, and
fourth PDSCHs that provide fourth TBs, wherein the receptions of the fourth PDSCHs are semi-persistently scheduled (SPS);
determining:
third HARQ-ACK information bits associated with the third TBs,
fourth HARQ-ACK information bits associated with the fourth TBs,
a third PUCCH resource, from the set of PUCCH resources, associated with the third HARQ-ACK information bits,
a fourth PUCCH resource, from the list of PUCCH resources, associated with the fourth HARQ-ACK information bits, and
that the third PUCCH resource overlaps in time with the fourth PUCCH resource; and
transmitting a second PUCCH using a PUCCH resource from the list of PUCCH resources, wherein the second PUCCH includes the third HARQ-ACK information bits and the fourth HARQ-ACK information bits.

8. A user equipment (UE) comprising:
a transceiver configured to receive:
information for a set of physical uplink control channel (PUCCH) resources,
first physical downlink shared channels (PDSCHs) that provide first transport blocks (TBs), and
second PDSCHs that provide second TBs; and
a processor operably coupled to the transceiver, the processor configured to determine:
first hybrid automatic repeat request acknowledgement (HARQ-ACK) information bits associated with the first TBs, wherein a value for each of the first HARQ-ACK information bits corresponds to positive acknowledgement (ACK),
second HARQ-ACK information bits associated with the second TBs, wherein one or more values of the second HARQ-ACK information bits correspond to a negative acknowledgement (NACK),
a first PUCCH resource from the set of PUCCH resources for transmission of a first PUCCH with the second HARQ-ACK information,
to provide the first HARQ-ACK information bits in a first slot when at least one PUCCH resource from the set of PUCCH resources overlaps in time with a transmission of a first physical uplink shared channel (PUSCH) in the first slot; and
to provide the second HARQ-ACK information bits in a second PUSCH in a second slot when the first PUCCH resource overlaps in time with a transmission of the second PUSCH in the second slot, and
to provide the second HARQ-ACK information bits in the first PUCCH in the second slot when the first PUCCH resource does not overlap in time with any PUSCH transmission in the second slot; and
wherein the transceiver is further configured to transmit:
the first PUSCH in the first slot, wherein the first PUSCH includes the first HARQ-ACK information bits when the at least one PUCCH resource overlaps in time with the first PUSCH, and
the second PUSCH in the second slot, wherein:
the second PUSCH includes the second HARQ-ACK information bits, and
the first PUCCH resource overlaps with the second PUSCH transmission, or
the first PUCCH in the second slot using the first PUCCH resource, wherein:
the first PUCCH includes the second HARQ-ACK information bits, and
the first PUCCH resource does not overlap in time with any PUSCH transmission in the second slot.

9. The UE of claim 8, wherein all PUCCH resources from the set of PUCCH resources do not overlap in time with a transmission of a second PUCCH in the first slot.

10. The UE of claim 8, wherein all PUCCH resources in the set of PUCCH resources have same symbols in a slot.

11. The UE of claim 8, wherein:
the set of PUCCH resources includes a PUCCH resource for each combination of values for third HARQ-ACK information bits,
at least one value from the values corresponds to a negative acknowledgement (NACK), and
a number of the first HARQ-ACK information bits is smaller than or equal to a number of the third HARQ-ACK information bits.

12. The UE of claim 8, wherein:
the transceiver is further configured to receive third PDSCHs that provide third TBs;
the processor is further configured to determine:
   that all PUCCH resources from the set of PUCCH resources available for transmission of a third PUCCH with third HARQ-ACK information bits associated with the third TBs in a third slot overlap in time with a transmission of a second PUCCH in the third slot,
   that a value for each of the third HARQ-ACK information bits corresponds to ACK, and
   that a priority of the third HARQ-ACK information bits is higher than a priority of information bits in the second PUCCH; and
the transceiver is further configured to cancel transmission of the second PUCCH and of the third PUCCH in the third slot.

13. The UE of claim 8, wherein:
the transceiver is further configured to receive third PDSCHs that provide third TBs;
the processor is further configured to determine:
   third HARQ-ACK information bits associated with the third TBs, wherein a value for each of the third HARQ-ACK information bits corresponds to ACK, and
   to provide the third HARQ-ACK information bits only when the at least one PUCCH resource overlaps in time with a transmission of a third PUCCH in a third slot; and
the transceiver is further configured to transmit the third PUCCH in the third slot, wherein the PUCCH includes the third HARQ-ACK information bits when the at least one PUCCH resource overlaps in time with transmission of the third PUCCH in the third slot.

14. The UE of claim 8, wherein:
the transceiver is further configured to receive:
   a list of PUCCH resources,
   third PDSCHs that provide third TBs, wherein the receptions of the third PDSCHs are scheduled by downlink control information (DCI) formats, and
   fourth PDSCHs that provide fourth TBs, wherein the receptions of the fourth PDSCHs are semi-persistently scheduled (SPS);
the processor is further configured to determine:
   third HARQ-ACK information bits associated with the third TBs,
   fourth HARQ-ACK information bits associated with the fourth TBs,
   a third PUCCH resource, from the set of PUCCH resources, associated with the third HARQ-ACK information bits,
   a fourth PUCCH resource, from the list of PUCCH resources, associated with the fourth HARQ-ACK information bits, and
   that the third PUCCH resource overlaps in time with the fourth PUCCH resource; and
the transceiver is further configured to transmit a second PUCCH using a PUCCH resource from the list of PUCCH resources, wherein the second PUCCH includes the third HARQ-ACK information bits and the fourth HARQ-ACK information bits.

15. A base station comprising:
a transceiver configured to transmit:
   information for a set of physical uplink control channel (PUCCH) resources, wherein:
      the set of PUCCH resources includes a PUCCH resource for each combination of values for a number of hybrid automatic repeat request acknowledgement (HARQ-ACK) information bits, and
      at least one value from the values corresponds to negative acknowledgement (NACK), and
   first physical downlink shared channels (PDSCHs) that provide first transport blocks (TBs); and
a processor operably coupled to the transceiver, the processor configured to determine whether a condition is valid, wherein:
   the condition is that a reception of a first PUCCH would overlap in time with a reception of a physical uplink shared channel (PUSCH) or with a reception of a second PUCCH, and
   the first PUCCH includes first HARQ-ACK information bits associated with the first TBs and uses at least one PUCCH resource from the set of PUCCH resources,
wherein the transceiver configured to receive one of:
   the first PUCCH when the condition is not valid, wherein at least one of the first HARQ-ACK information bits has a value that corresponds to NACK, or
   the PUSCH or the second PUCCH when the condition is valid, wherein the PUSCH or the second PUCCH includes the first HARQ-ACK information bits, and
wherein a number of the first HARQ-ACK information bits is smaller than or equal to the number of HARQ-ACK information bits.

16. The base station of claim 15, wherein all PUCCH resources in the set of PUCCH resources have same symbols in a slot.

17. The base station of claim 15, wherein:
the transceiver is further configured to transmit second PDSCHs that provide second TBs, wherein second HARQ-ACK information bits are associated with the second TBs; and
the processor is further configured to determine:
   that all PUCCH resources from the set of PUCCH resources available for reception of a second PUCCH with the second HARQ-ACK information bits overlap in time with a third PUCCH resource for reception of a third PUCCH with third control information bits,
   that a priority for the second HARQ-ACK information bits is higher than a priority of the third control information bits,
   that the second PUCCH and the third PUCCH will not be received, and
   that a value for each of the second HARQ-ACK information bits corresponds to ACK.

18. The base station of claim 15, wherein:
the transceiver is further configured to transmit:
   a list of PUCCH resources,
   second PDSCHs that provide second TBs, wherein the transmissions of the second PDSCHs are scheduled by downlink control information (DCI) formats, and
   third PDSCHs that provide third TBs, wherein the transmissions of the third PDSCHs are semi-persistently scheduled (SPS);
the processor is further configured to determine:
   second HARQ-ACK information bits associated with the second TBs,
   third HARQ-ACK information bits associated with the third TBs;

a second PUCCH resource, from the set of PUCCH resources, for a second PUCCH transmission with the second HARQ-ACK information bits, a third PUCCH resource, from the list of PUCCH resources, associated with the third HARQ-ACK information bits, and that the third PUCCH resource overlaps in time with the second PUCCH resource; and the transceiver is further configured to receive a PUCCH using a PUCCH resource from the list of PUCCH resources, wherein the PUCCH includes the second HARQ-ACK information bits and the third HARQ-ACK information bits.

\* \* \* \* \*